No. 777,579. PATENTED DEC. 13, 1904.
S. W. WILT.
BIRD TRAP.
APPLICATION FILED SEPT. 8, 1904.
NO MODEL.

Witnesses
C. Munter
L. O. Hilton

Inventor
Samuel W. Wilt
by H. B. Wilson
Attorney

No. 777,579. Patented December 13, 1904.

UNITED STATES PATENT OFFICE.

SAMUEL W. WILT, OF ALVADA, OHIO.

BIRD-TRAP.

SPECIFICATION forming part of Letters Patent No. 777,579, dated December 13, 1904.

Application filed September 8, 1904. Serial No. 223,761. (No model.)

*To all whom it may concern:*

Be it known that I, SAMUEL W. WILT, a citizen of the United States, residing at Alvada, in the county of Seneca and State of Ohio, have invented certain new and useful Improvements in Bird-Traps; and I do declare the following to be a full, clear, and exact description of the invention, such as will enable others skilled in the art to which it appertains to make and use the same.

This invention relates to bird-traps, and is designed more particularly as a trap for sparrows and other destructive birds.

One of the objects of the invention is to provide a self-setting trap of simple construction which will be inexpensive to manufacture and which will be reliable and efficient in use. These and other objects are attained by means of the construction illustrated in the accompanying drawings, in which—

Figure 1:
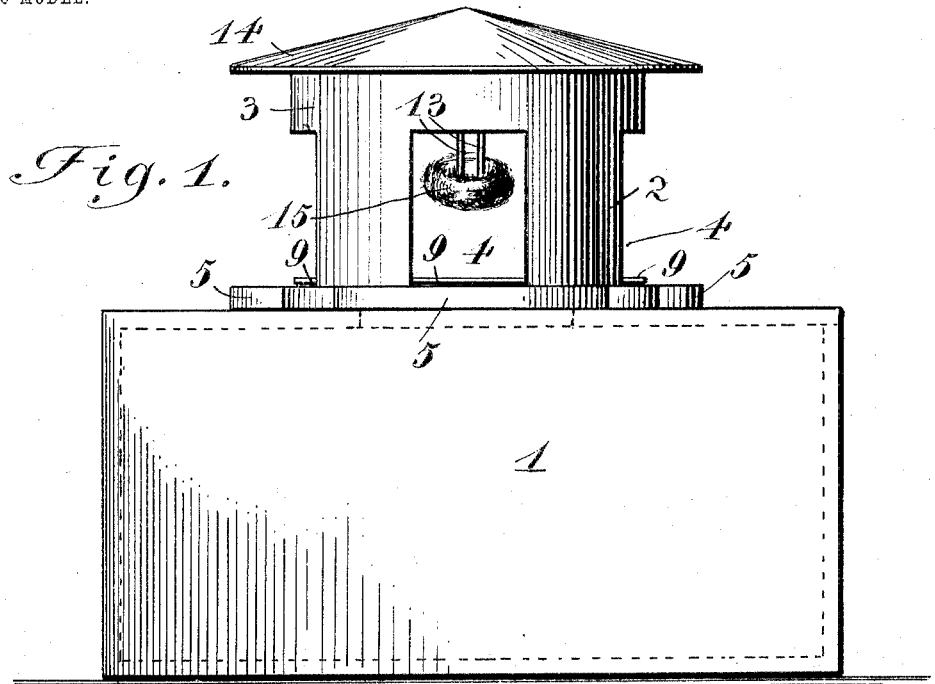
Figures 2, 3:
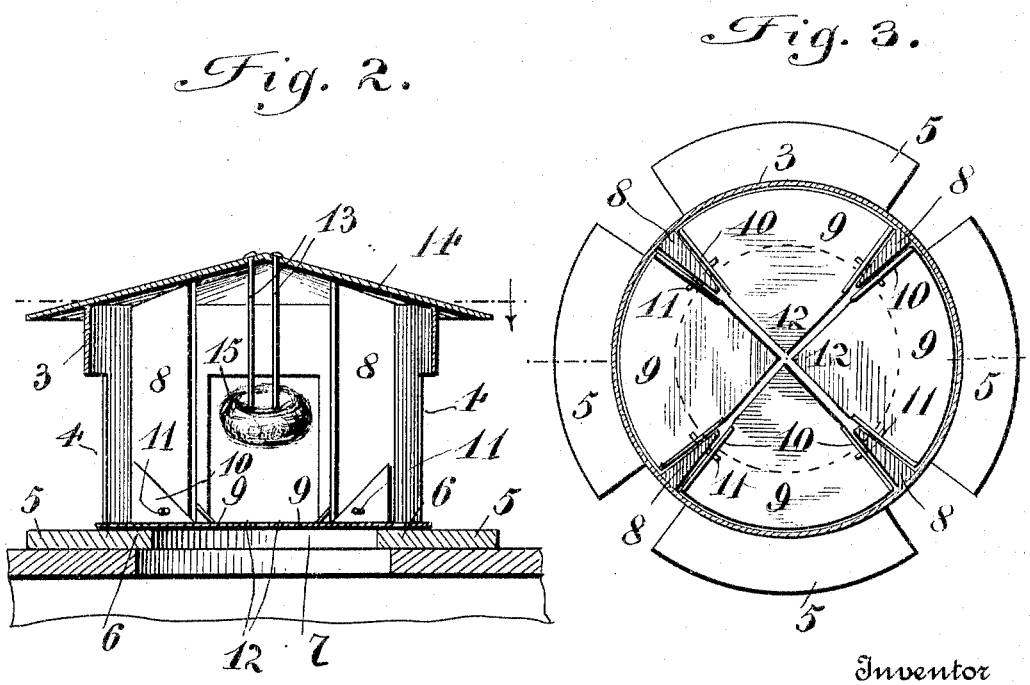

Figure 1 is a side view of a bird-trap made in accordance with my invention. Fig. 2 is a longitudinal sectional view of the same. Fig. 3 is a plan view of the trap with the top or cover removed.

Referring to the drawings for a more particular description of my invention, the numeral 1 designates a suitable cage, which may be of any desired shape or size and provided in its upper wall or top with a suitable hole or opening upon which the trap 2 is designed to rest. The trap 2 comprises a side wall 3, having a number of openings or doors 4 leading to the interior of the trap, and projecting outward from each door is a sill or step 5, forming a continuation of the floor 6 of the trap, said floor having a central opening 7, which communicates with the opening in the top of the cage 1. Partitions 8 extend between the doors from the inner surface of the wall to the edge of the opening 7 in the floor to prevent the birds after entering the door 4 from turning to the right or the left and to compel them to move forward to step upon the inner end of the pivoted trap-doors 9 and drop into the opening 7 into the cage 1. The trap-doors 9 extend from the doors 4 to a central point in the opening 7, the said trap-doors being of substantially triangular shape, as shown, and provided with side lugs 10, connected by pintles or pivots 11 to the partitions 8, as shown. Owing to the excess of weight at the outer end of the trap-door 9, said door is normally held in a horizontal position to close the opening 7. The inner end 12 of these trap-doors coming together in the center of the trap cover the opening 7 in the floor.

Suspended from a suitable support 13, extending from the top or cover 14, is a bird-nest or imitation thereof, 15.

The operation of my invention is as follows: The trap 2, which may be of any desired shape and size and provided with any suitable number of doors 4 and trap-doors 9, is placed upon a cage or box having an opening in its top over which the trap 2 is adapted to be supported. Birds, and more particularly sparrows, will be attracted to the trap by the nest 15, since sparrows are nest-destroyers, and, passing in the door, step upon the inner end 12 of the trap-door, and thus swing said trap-door upon its pintle 11 and drop through said door into the cage, said door returning to its normal position. The partitions 8 serve to prevent the bird from turning or flying upward to escape after he has stepped upon the inner end of the trap-door.

From the foregoing it will be obvious that my invention is of simple construction, self-setting, and can be manufactured at slight cost and will be found efficient in operation.

Various changes in the form, proportion, and the minor details of construction may be resorted to without departing from the principle or sacrificing any of the advantages of the invention.

Having thus described my invention, what I claim, and desire to secure by Letters Patent, is—

1. A bird-trap comprising a cage having an opening in its top, a compartment adapted to rest over said opening and having a floor provided with an opening therein which communicates with said opening in the cage, a plurality of doors in the side wall of the trap, partitions extending between the doors, and pivoted trap-doors extending from the doors in the trap to the center of the opening in the floor, said trap-doors being held in horizontal positions to cover the opening in the floor by means of excessive weight at their outer ends, substantially as described.

2. A bird-trap comprising a casing, a cover therefor, a bird's nest suspended from the center of said cover within the casing, a plurality of doors leading into the casing, trap-doors pivoted near the door-openings, partitions between the door-openings, said trap-doors being of substantially triangular form and of greater weight at their outer ends, substantially as described.

In testimony whereof I have hereunto set my hand in presence of two subscribing witnesses.

SAMUEL W. WILT.

Witnesses:
C. W. POPENBURG,
WARREN P. DILLON.